Dec. 20, 1966    A. D. L. HUTCHINSON    3,292,802
RETRACTABLE SUPPORT FOR SEMITRAILER
Filed June 7, 1963    2 Sheets-Sheet 1

INVENTOR.
ARCHIBALD D.L. HUTCHINSON
BY
ATTORNEYS.

INVENTOR.
ARCHIBALD D. L. HUTCHINSON
BY Lyon & Lyon
ATTORNEYS.

United States Patent Office 3,292,802
Patented Dec. 20, 1966

3,292,802
RETRACTABLE SUPPORT FOR SEMITRAILER
Archibald D. L. Hutchinson, Seattle, Wash., assignor to Kneeling Nellie, Inc., Seattle, Wash., a corporation of Washington
Filed June 7, 1963, Ser. No. 286,356
7 Claims. (Cl. 214—506)

This invention relates to trailers and more particularly relates to a semitrailer having a retractable landing gear.

Semitrailers of the type hauled by trucks and partially supported by the fifth wheel connections thereof are generally provided with a landing gear at the forward end for supporting the trailer in a horizontal position when the truck or tractor is removed. Semitrailers of this sort must generally be unloaded through back or side doors and require either a platform of approximately equal height or a large investment in labor or in power hoist equipment for moving the load from level to level. The usefulness of such trailers is therefore limited to permanent or well-equipped loading or unloading stations.

According to the present invention, a semitrailer is provided which may be easily loaded and unloaded by one man regardless of the presence or absence of a loading platform or the height thereof and without the use of any hoisting equipment. This is accomplished by providing a retractable landing gear so positioned and constructed that the front end of the trailer may be lowered to rest on any platform of intermediate height or to rest on the ground so that the trailer may be unloaded through the front doors by one man using simple and readily available equipment. The landing gear is power operated and located in an intermediate position relative to the rear wheels and the front end of the trailer so that it does not interfere with the lowering of the front end of the trailer to ground level.

It is therefore an object of the present invention to provide a semitrailer which may be loaded or unloaded irrespective of the height of the loading or unloading surface.

It is also an object of the present invention to provide apparatus for enabling the front end of a semitrailer to be positioned at a desirable level.

It is another object of the present invention to provide such apparatus in which a landing gear may be retracted to lower the front end of a semitrailer to rest on the ground.

These and other objects and advantages of the present invention will become more apparent upon reference to the accompanying description and drawings in which.

Figure 1:
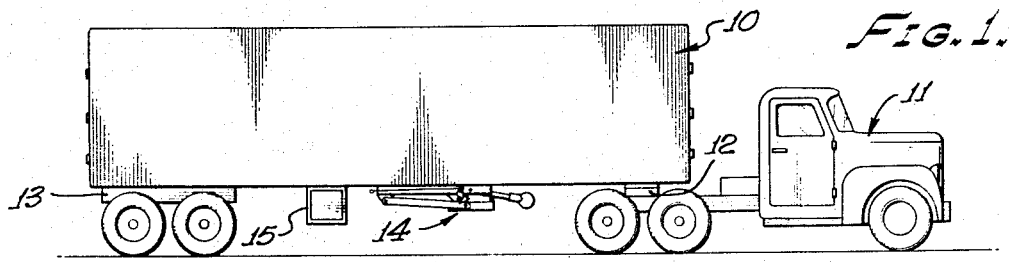
FIGURE 1 illustrates the landing gear of a first embodiment of the present invention in a retracted position, the trailer being supported by the fifth wheel connection of a truck.

Referring now to FIGURE 1, there is shown a semitrailer 10 connected to and supported by a truck 11 by means of a conventional fifth wheel connection 12. Positioned between the front of the trailer 10 and the rear axle and wheel assembly 13 is a retractable landing gear 14 according to the present invention. A power unit box 15 containing a conventional gasoline engine, hydraulic pump, oil reservoir tank and control value for the landing gear 14 is positioned between this landing gear and the rear wheel and axial assembly 15.

Figure 2:
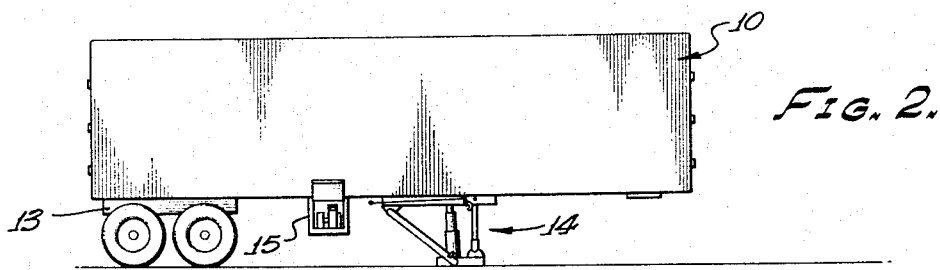
FIGURE 2 shows the landing gear of FIGURE 1 extended to support the trailer in a horizontal position.
Figure 3:
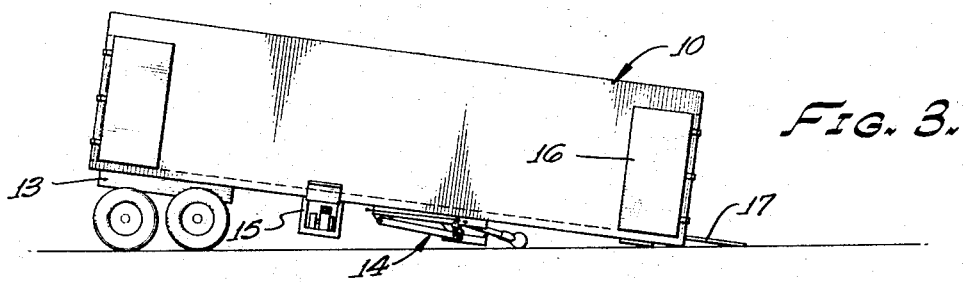
FIGURE 3 shows the landing gear of FIGURE 1 retracted to permit the front end of the trailer to engage the ground.

FIGURE 2 shows the landing gear 14 extended so as to support the trailer 10 in horizontal position after the truck 11 has been removed. FIGURE 3 shows the position of the trailer 10 after the landing gear 14 has been retracted. As can be seen from this figure, the landing gear 14 and power unit box 15 are positioned far enough to the rear of the trailer to permit the front end of the trailer to rest upon the ground. This permits the easy loading and unloading of the trailer through its front doors 16. The trailer may be loaded or unloaded, for example, by use of a hand operated dolly for which purpose a ramp 17 is provided.

Figure 4:
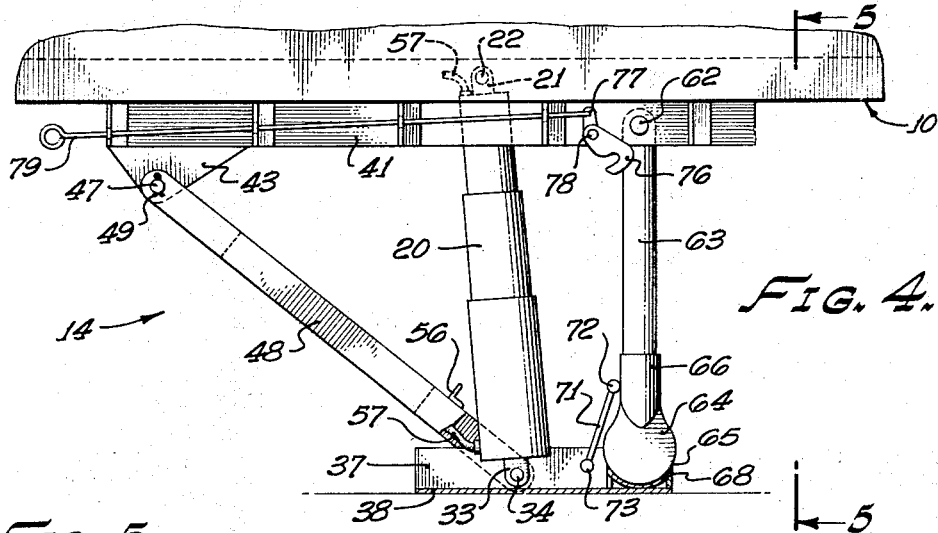
FIGURE 4 is a side elevation view, partly in section, showing the landing gear of FIGURE 1.
Figure 5:
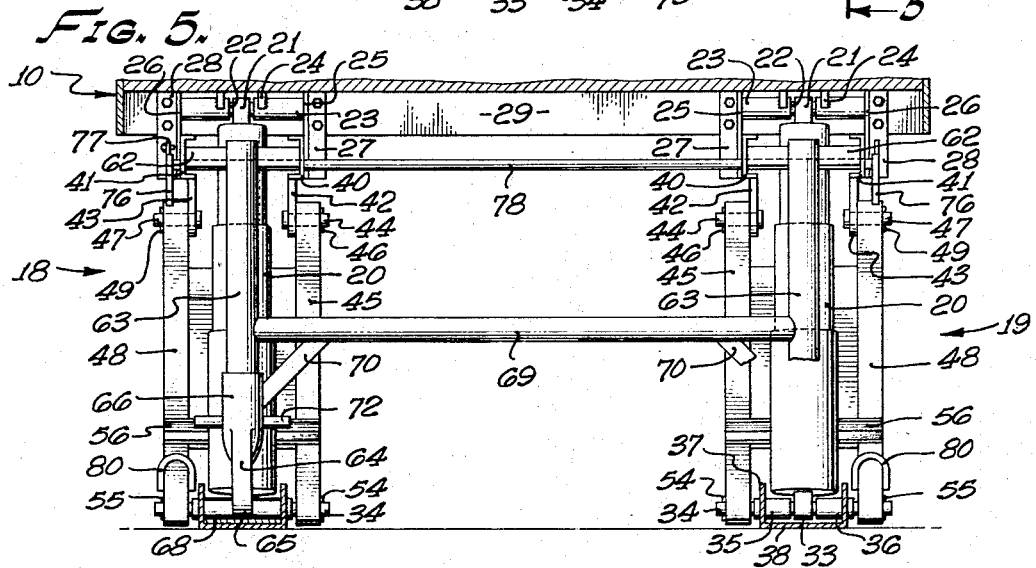
FIGURE 5 is a front elevation, partly in section, taken substantially along lines 5—5 of FIGURE 4.
Figure 6:
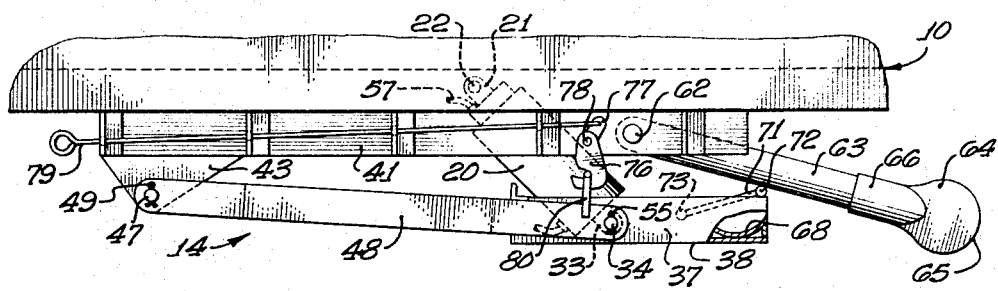
FIGURE 6 is a side elevation showing the landing gear of FIGURE 4 in a retracted position.

Referring now to FIGURES 4, 5 and 6, the details of the retractable landing gear 14 are shown. The retractable landing gear 14 has two substantially identical legs 18 and 19 as can be seen from FIGURE 5. For purposes of clarity and simplicity reference numerals are assigned only once to each similar part, the reference numerals on the drawing being associated with the leg where the respective parts are best illustrated.

Each leg has a double acting hydraulic cylinder 20 which provides the motive power for extending and retracting the landing gear. The upper end of the hydraulic cylinder 20 is provided with a bracket 21 which is rotatably mounted on a reduced portion 22 of a shaft 23. The shaft 23 is supported by a pair of supporting brackets 24 which are welded or otherwise suitably attached to the underframe of the trailer. Further support is given to the shaft 23 by fastening its ends to parallel frame members 25 and 26. These frame members 25 and 26 may be provided with flanges 27 and 28 which may be bolted or otherwise attached to a suitable cross brace 29 of the underframe of the trailer.

The lower end of the double acting hydraulic cylinder 20 is also provided with a bracket 33. This bracket is rotatably mounted on a shaft 34 which is also journaled in bearings 35 and 36 which pass through and are welded to the upstanding parts 37 of ground-engaging shoe 38. The shoe 38 is thus able to pivot freely relative to the cylinder 20.

Channel irons 40 and 41 are welded or otherwise fastened to the lower portions of frame members 25 and 26 and have depending therefrom plates 42 and 43. The plate 42 mounts a shaft 44 of which is rotatably mounted an elongated brace 45. The brace 45 is held in position on the shaft 44 by means of a cotter pin 46. In a similar manner, the plate 43 mounts a shaft 47 on which is rotatably mounted an elongated brace 48 held in position by a cotter pin 49.

The lower ends of the elongated braces 45 and 48 are rotatably mounted on the ends of the shaft 34, the braces 45 and 48 being maintained in position by cotter pins 54 and 55 or any other suitable fastening device. The elongated braces 45 and 48 are provided with additional strength by means of a stabilizing brace 56. The double-acting hydraulic cylinders 20 are connected to the hydraulic pump in the power unit box 15 by means of suitable hydraulic lines 57.

Each leg is further provided with a shaft 62 mounted between the channel irons 40 and 41 forward of the double-acting hydraulic cylinder 20. A strut 63 is rotatably mounted on the shaft 62 and has a terminal member 64 mounted on its lower end. Preferably, the terminal member 64 has a rounded section 65 and a tubular section 66 which telescopes over the end of the member 63. The terminal member 64 is adapted to fit into a recess or socket 68 mounted on the forward portion of the ground-engaging shoe 38. If desired, the terminal member 64 may be replaced by a wheel rotatably mounted on the end of the member 63. The two members 63 are provided with added strength by a connecting member 69 and braces 70.

A lever 71 having a cross piece 72 is pivotally mounted on a pin 73 supported in the ground-engaging shoe 37. When the lever 71 is pushed forward, the cross piece 72 causes the terminal member 64 to ride up out of the socket 68. Only one of the legs need be provided with such a lever.

In order to maintain the landing gear in its retracted position independently of the hydraulic cylinders, a hook 76 and linkage 77 are pivotally mounted on a shaft 78 mounted in the channel iron 41 intermediate the hydraulic cylinder and the member 63. The hook 76 is caused to pivot by the action of an operating rod 79. The lower end of each of the elongated braces 48 is provided with a loop 80 which may be welded or otherwise affixed to the brace. The hook 76 is adapted to engage this loop and maintain the landing gear in the retracted position. Preferably the hook operation is interconnected with the hydraulic valve so that the valve cannot be moved to extend the cylinders until the hooks are unhooked.

In operation, when the trailer is connected to the truck and supported thereby, the landing gear 14 is in retracted position and held in retracted position by the interaction of the hooks 76 and loops 80. If the trailer is to be loaded or unloaded in an area having a suitable loading platform, the trailer can be backed up to the platform in the normal manner, the hook 76 uncoupled from the loops 80 by means of the operating rod 79, and the hydraulic cylinders 20 expanded.

Expansion of the hydraulic cylinders 20 cause them and the braces 48 and 45 to rotate in a clockwise direction until the cylinder is in a generally vertical position. The ground-engaging shoe 38 will engage the ground and be caused to rotate in a counterclockwise direction by this engagement until it is flush with the ground. The members 63 automatically follow the downward movement of the shoe 38 and the terminal members 64 will drop into the shoes 68 and act as a safety in the event that the hydraulic system fails when the truck is disconnected.

In the event that there is no loading platform available, or the loading platform available is lower than the conventional height, the retractable landing gear of the present invention can be used to permit the front of the trailer to engage the platform or the ground. When this is to be done, the landing gear is extended as described previously and the truck disconnected. The lever 71 is then pushed forward to free the members 64 from the shoe 68. The hydraulic cylinders are then contracted with the result that the front end of the trailer slowly descends until it engages and is supported by the platform or the ground. The trailer may now easily be loaded or unloaded through the front doors. The brace 56 prevents the ground engaging shoe 38 from pivoting into contact with the ground.

From the foregoing description, it can be seen that a trailer has been provided that may be loaded or unloaded whether or not a loading platform is present. This is accomplished by providing a retractable landing gear so positioned on the undersurface of the trailer that the front end of the trailer may engage the ground when the landing gear is completely retracted. This permits the front doors of the trailer to be used for loading and unloading and greatly increases the usefulness and versatility of the trailer. Of course, any type trailer may be used, the invention not being limited to the enclosed trailer having front doors illustrated.

The invention may be embodied in other specific forms not departing from the spirit or central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A trailer of the type described comprising a trailer body; an axle assembly mounted adjacent one end of said trailer body; and a landing gear mounted on said trailer body, said landing gear including first and second multiple stage power cylinders and a ground-engaging shoe, each of said cylinders having one end connected to said trailer body and the other end connected to said shoe whereby actuation of said cylinders causes relative movement between said shoe and said trailer body, a pair of angular braces each pivotally connected at one end to the trailer at a point spaced in one longitudinal direction of the trailer body from said one end of a respective cylinder and pivotally connected at the other end to one of said shoes, respectively, and a pair of safety legs each pivotally connected at one end to the trailer at a point spaced in the opposite longitudinal direction of the trailer body from said one end of a respective cylinder and each having a free end adapted to engage one of said shoes, respectively, when said trailer is in elevated position.

2. A trailer of the type described comprising a trailer body; an axle assembly mounted on the undersurface of said body adjacent one end thereof; and a landing gear mounted on the undersurface of said trailer body, said landing gear including a framework fastened to said underside of said body, first and second multiple stage acting power cylinders having one end rotatably mounted on said framework, first and second members, each of said members having one end rotatably mounted on said framework and the other end rotatably connected with the other end of a respective power cylinder, a ground engaging shoe connected to said other ends of said power cylinders; said landing gear being positioned on said undersurface so that said power cylinders may be retracted to permit the other end of said trailer body to engage the ground and extended to maintain said trailer body in a substantially horizontal position, said ground engaging shoe being provided with a socket, and strut means having one end pivotally mounted on said framework and the other end receivable in said socket when the trailer body is in said substantially horizontal position.

3. The apparatus of claim 2 wherein said means include elongated members each having one end rotatably mounted on said framework and carrying a terminal member at the other end for fitting into said socket.

4. The apparatus of claim 3 wherein means are provided on said ground-engaging shoe for forcing said terminal members out of said socket.

5. In a retractable landing gear assembly for a semitrailer, the combination of: a frame adapted to be secured to the trailer, a pair of extensible power cylinder assemblies pivotally mounted on said frame, a pair of ground-engaging shoes each pivotally connected to one of said power cylinders, respectively, a pair of angular braces each having one end pivotally connected to said frame and the other end pivotally connected to one of said shoes, respectively, each shoe having a socket, and a pair of struts each pivotally mounted at one end to said frame and having a terminal member at the other end receivable in one of said sockets, respectively.

6. In a retractable landing gear assembly for a semitrailer, the combination of: a frame adapted to be secured to the trailer, a pair of extensible power cylinder assemblies pivotally mounted on said frame, a pair of ground-engaging shoes each pivotally connected to one of said power cylinders, respectively, a pair of angular braces each having one end pivotally connected to said frame and the other end pivotally connected to one of said shoes, respectively, a pair of struts each pivotally mounted at one end to the frame and the other end being free, interengageable means on the free ends of said struts and said shoes, each shoe having a portion engageable with one of said struts, respectively, between its ends so that the struts may be held in an inoperative position by said shoes when said power cylinder assemblies are retracted.

7. A semi-trailer, said semi-trailer having a rear wheel carriage, said semi-trailer having a front, on the underneath of the semi-trailer there being a fifth wheel connection, said fifth wheel conection being spaced rearwardly of the front to leave the front free and clear, said semi-trailer having a jack means between the front and the rear wheel carriage for raising and lowering the front of the semi-trailer, said jack means comprising a fluid actuated cylinder having a plunger, and a shoe, said plunger being pivoted to the semi-trailer and said cylinder being pivoted to the shoe, a stabilizer bar, one end of said stabilizer bar being pivoted to the semi-trailer, and the other end of said stabilizer bar being pivoted to the shoe, a safety leg pivoted to the semi-trailer, said shoe being capable of receiving the free end of the safety leg.

References Cited by the Examiner

UNITED STATES PATENTS

| 2,190,252 | 2/1940 | Brant et al. | 214—506 X |
| 2,596,462 | 5/1952 | Ball. | |
| 2,851,181 | 9/1958 | Thomann | 214—506 |
| 3,104,891 | 9/1963 | Dalton | 254—86 |

FOREIGN PATENTS

| 1,062,775 | 4/1954 | France. |
| 445,239 | 4/1936 | Great Britain. |
| 607,555 | 9/1942 | Great Britain. |

GERALD M. FORLENZA, *Primary Examiner.*

HUGO O. SCHULZ, *Examiner.*

A. J. MAKAY, *Assistant Examiner.*